(12) United States Patent
Olsson et al.

(10) Patent No.: US 8,224,537 B2
(45) Date of Patent: Jul. 17, 2012

(54) METHOD AND APPARATUS FOR DRY CLUTCH TEMPERATURE PREDICTION IN A DCT

(75) Inventors: Markus Olsson, Trollhattan (SE); Ulf Gimbergsson, Västra Frölunda (SE)

(73) Assignee: GM Global Technology Operations LLC

( * ) Notice: Subject to any disclaimer, the term of this patent is extended or adjusted under 35 U.S.C. 154(b) by 183 days.

(21) Appl. No.: 12/849,186

(22) Filed: Aug. 3, 2010

(65) Prior Publication Data

US 2011/0257838 A1  Oct. 20, 2011

Related U.S. Application Data

(60) Provisional application No. 61/325,966, filed on Apr. 20, 2010.

(51) Int. Cl.
*G06F 7/00* (2006.01)
(52) U.S. Cl. ............. 701/51; 701/29.1; 701/62; 701/87; 701/56; 477/34; 477/115; 477/166; 477/180; 477/125; 477/156; 477/98; 74/330; 74/331; 74/334; 74/340; 192/82 T

(58) Field of Classification Search .................... 701/29, 701/33.4, 35, 51, 56, 7, 62; 477/34, 115, 477/166, 180, 125, 156, 98; 74/340, 331, 74/334, 330; 192/82 T
See application file for complete search history.

(56) References Cited

U.S. PATENT DOCUMENTS

| | | | |
|---|---|---|---|
| 5,563,784 A * | 10/1996 | Miener | 701/51 |
| 6,006,149 A * | 12/1999 | Salecker et al. | 701/51 |
| 6,856,880 B2 * | 2/2005 | Shimaguchi | 701/51 |
| 2009/0249907 A1 * | 10/2009 | Singh et al. | 74/340 |
| 2011/0257838 A1 * | 10/2011 | Olsson et al. | 701/35 |

* cited by examiner

*Primary Examiner* — Redhwan k Mawari

(57) ABSTRACT

A clutch temperature prediction module for a dual clutch transmission (DCT) includes at least one clutch slip power module that determines a first clutch slip power of a first clutch and a second clutch slip power of a second clutch. A temperature calculation module receives the first clutch slip power, the second clutch slip power, an ambient air temperature, an engine oil temperature, and a transmission oil temperature, and calculates at least one clutch plate temperature and a clutch housing temperature based on the first clutch slip power, the second clutch slip power, the ambient air temperature, the engine oil temperature, and the transmission oil temperature using a linear time-invariant (LTI) model.

14 Claims, 4 Drawing Sheets

METHOD AND APPARATUS FOR DRY CLUTCH TEMPERATURE PREDICTION IN A DCT

CROSS-REFERENCE TO RELATED APPLICATIONS

This application claims the benefit of U.S. Provisional Application No. 61/325,966, filed on Apr. 20, 2010. The disclosure of the above application is incorporated herein by reference in its entirety.

FIELD

The present disclosure relates to a dual clutch transmission, and more particularly to predicting dry clutch temperature in a dual clutch transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A dual clutch transmission (DCT) for a vehicle includes first and second clutches arranged within a clutch housing. The DCT may be a wet DCT or a dry DCT. A wet DCT includes wet clutches and bathes components in lubricating fluid to reduce friction and heat. A dry DCT does not include a fluid batch and consequently includes dry clutches. In a dry DCT, slip decreases and fuel economy is improved. However, dry clutches experience greater thermal variation.

The clutch housing couples an engine of the vehicle to a first transmission shaft via the first clutch. For example only, the first transmission shaft may correspond to a first subset of gears (e.g. odd gears) of the DCT. The first subset of gears may include first, third, fifth, and reverse gears. The clutch housing couples the engine to a second transmission shaft via the second clutch. For example only, the second transmission shaft may correspond to a second subset of gears (e.g. even gears) of the DCT. The second subset of gears may include second, fourth, and sixth gears).

The clutches transfer torque from the engine to the transmission shafts. Friction between the clutches and the clutch housing determines an amount of torque transferred. Controlling respective positions (i.e. displacement) of the clutches controls the friction between the clutches and the clutch housing, thereby controlling the amount of torque transferred to the transmission shafts.

SUMMARY

A clutch temperature prediction module for a dual clutch transmission (DCT) includes at least one clutch slip power module that determines a first clutch slip power of a first clutch and a second clutch slip power of a second clutch. A temperature calculation module receives the first clutch slip power, the second clutch slip power, an ambient air temperature, an engine oil temperature, and a transmission oil temperature, and calculates at least one clutch plate temperature and a clutch housing temperature based on the first clutch slip power, the second clutch slip power, the ambient air temperature, the engine oil temperature, and the transmission oil temperature using a linear time-invariant (LTI) model.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
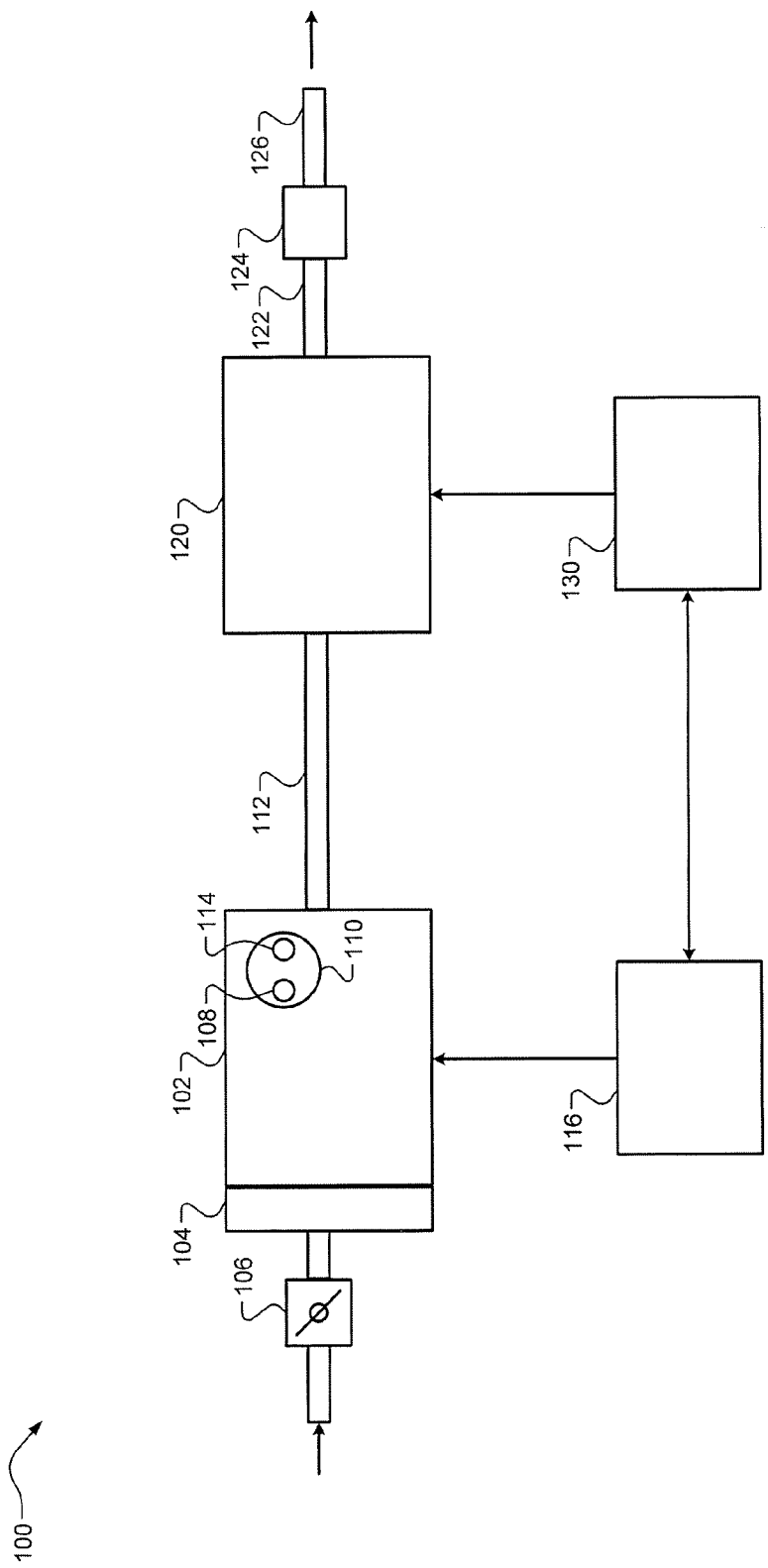
FIG. 1 is a functional block diagram of an exemplary power train system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality First and second dry clutches in a dry dual clutch transmission (DCT) are selectively coupled to a clutch housing via friction plates. An amount of torque transferred from the clutch housing to respective transmission shafts is based on friction between the friction plates and the clutches. Respective positions (i.e. displacement) of the clutches are controlled based on the friction and a desired torque. The friction may vary based on temperatures of the clutches. Accordingly, temperatures of the clutches, as well as the positions of the clutches, may affect the controlled torque.

Referring now to FIG. 1, a functional block diagram of an exemplary power train system 100 of a vehicle is shown. An engine 102 generates drive torque for the vehicle. One or more electrical motors (or motor-generators) may additionally or alternatively generate drive torque. While the engine 102 will be discussed as a spark-combustion internal combustion engine (ICE), the engine 102 may include another suitable type of engine, such as a compression combustion type engine, an electric type engine, or a hybrid type engine.

Air is drawn into the engine 102 through an intake manifold 104. Airflow into the engine 102 may be varied using a throttle valve 106. One or more fuel injectors 108 mix fuel with the air to form a combustible air/fuel mixture. The air/fuel mixture is combusted within cylinders of the engine 102, such as cylinder 110. Although the engine 102 is depicted as including one cylinder, the engine 102 may include more or fewer cylinders.

The cylinder 110 includes a piston (not shown) that is mechanically linked to a crankshaft 112. One combustion event within the cylinder 110 may be described in four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the air or air/fuel mixture within the cylinder 110.

The combustion phase begins when, for example, spark from a spark plug 114 ignites the air/fuel mixture. The combustion of the air/fuel mixture drives the piston back toward the bottommost position, and the piston rotatably drives the crankshaft 112. Resulting exhaust gas is expelled from the cylinder 110 to complete the exhaust phase and the combustion event. An engine control module (ECM) 116 controls the torque output of the engine 102.

The engine 102 outputs torque to a dual clutch transmission (DCT) 120 via the crankshaft 112. The DCT 120 receives torque output by the engine 102 and selectively transfers torque to one or more wheels of the vehicle (not shown). More specifically, torque input to the DCT 120 via the crankshaft 112 is selectively transmitted to a transmission output shaft 122 based on a gear ratio engaged within the DCT 120. The transmission output shaft 122 transfers torque to a differential 124, and the differential 124 transfers torque to one or more wheels of the vehicle via a driveline 126.

A gear ratio (or drive ratio) may be defined as the ratio of an input speed of the DCT 120 to an output speed of the DCT 120. The input speed and the output speed of the DCT 120 may be measured using one or more sensors. In some implementations the input speed may be based on the output speed of the engine 102 (i.e., the rotational speed of the crankshaft 112 or a flywheel) or another suitable measure of the input speed. The output speed of the DCT 120 may be measured using one or more sensors based on rotation of the transmission output shaft 122.

A transmission control module (TCM) 130 controls the gear ratio by controlling which clutch, input shaft, and gearset receive drive torque and which gearset is coupled to the transmission output shaft 122. The TCM 130 may control the gear ratio based on various shift maps, measured parameters (e.g., throttle opening and vehicle speed), and/or inputs from a driver (e.g., upshifts and downshifts). The ECM 116 and the TCM 130 may communicate with one another via a controller area network (CAN), for example, to coordinate shifts within the DCT 120 and to make various parameters available to one another.

The TCM 130 according to the present disclosure determines current temperatures of clutches of the DCT 120. For example, the TCM 130 stores previous clutch temperatures and a clutch thermal model. The clutch thermal model predicts current clutch temperatures based on the previous clutch temperatures, input clutch torque, clutch slip, and one or more environmental temperatures.

Figure 2:
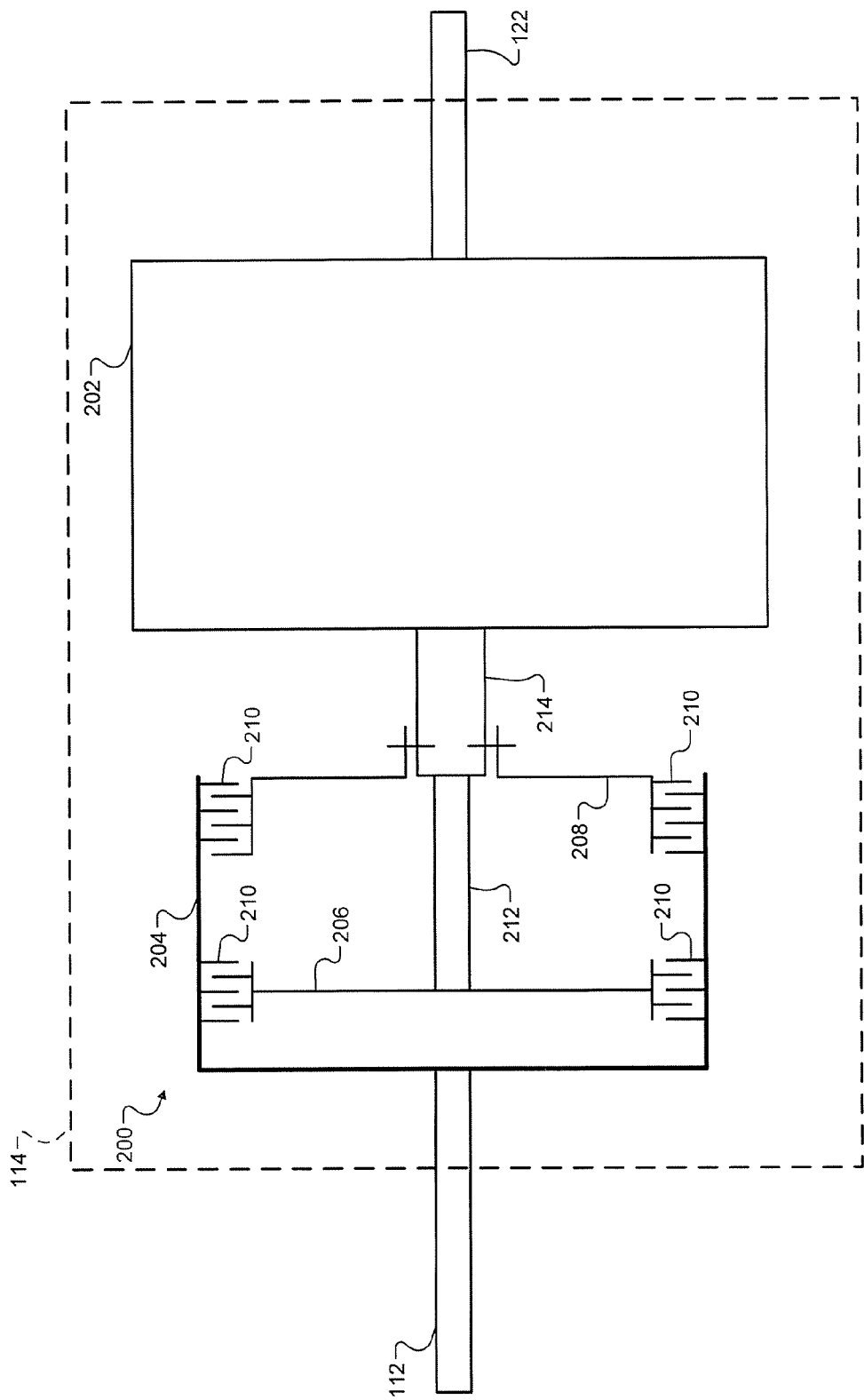
FIG. 2 is a diagram of an exemplary implementation of a dual clutch transmission (DCT) according to the principles of the present disclosure.

Referring now to FIG. 2, the DCT 120 includes a clutch portion 200 and a gearing portion 202. The clutch portion 200 includes a clutch housing 204. The clutch housing 204 is connected for common rotation with the crankshaft 112. The clutch housing 204 includes a first dry clutch plate 206 and a second dry clutch plate 208. Friction plates 210 are mounted on the clutch housing 204 and each of the clutch plates 206, 208 to form a friction clutch arrangement.

The first clutch plate 206 is connected for common rotation with a first transmission shaft 212. The second clutch plate 208 is connected for common rotation with a second transmission shaft 214. The first clutch plate 206 is selectively engaged with the clutch housing 204 via the friction plates 210 to transfer the rotation of the crankshaft 112 to the first transmission shaft 212. The second clutch plate 208 is selectively engaged with the clutch housing 204 via the friction plates 210 to transfer the rotation of the crankshaft 112 to the second transmission shaft 214. Accordingly, engaging the first clutch plate 206 with the clutch housing 204 rotates a first set of gears within the gearing portion 202. Conversely, engaging the second clutch plate 208 with the clutch housing 204 rotates a second set of gears within the gearing portion 202.

Figure 3:
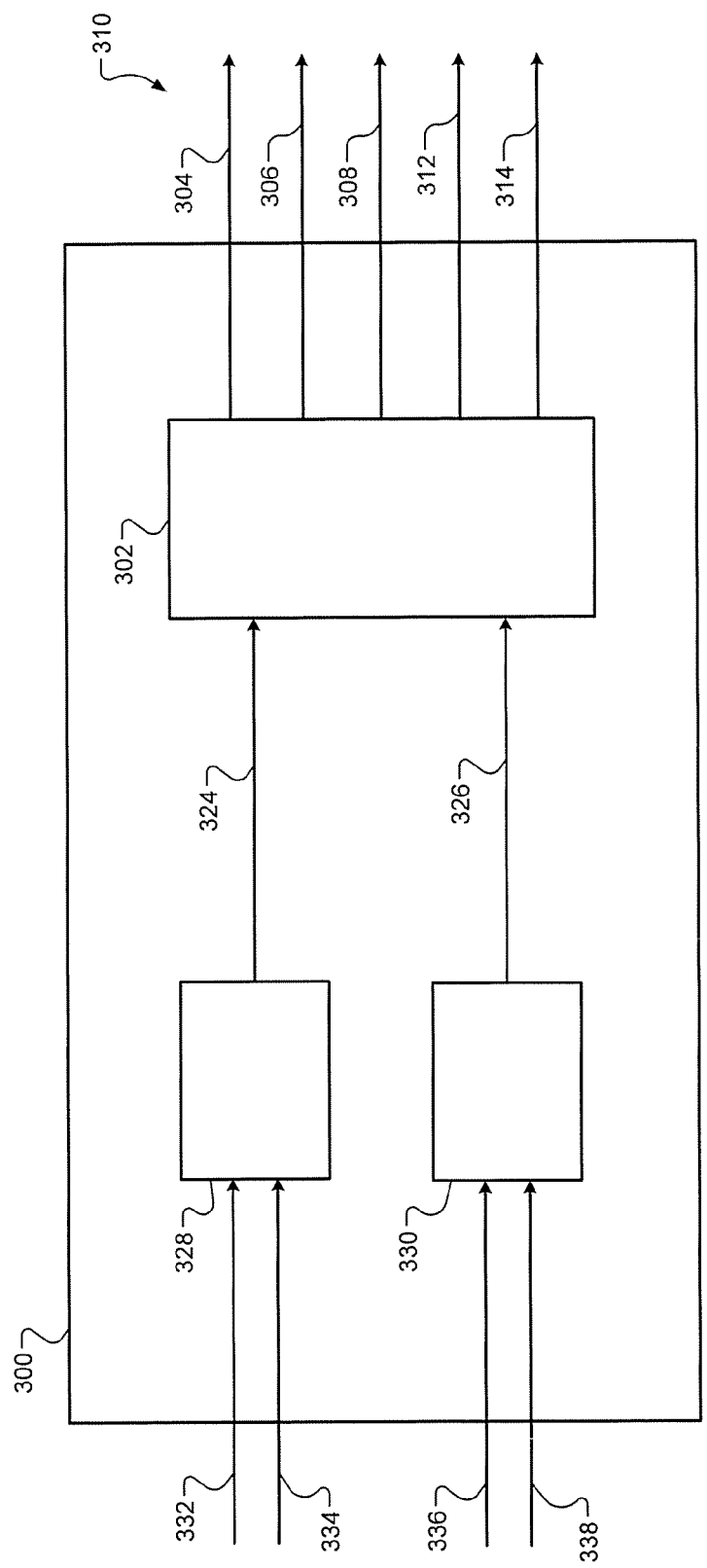
FIG. 3 is a functional block diagram of a transmission control module according to the principles of the present disclosure.

Referring now to FIG. 3, the TCM 130 includes a clutch temperature prediction module 300. The clutch temperature prediction module 300 determines current clutch temperatures (i.e. temperatures of the clutch housing 204 and the first and second clutch plates 208, 210) based on previous clutch temperatures and a clutch thermal model. The clutch thermal model predicts current clutch temperatures based on the previous clutch temperatures, input clutch torque, clutch slip, and one or more environmental temperatures.

The clutch temperature prediction module 300 includes a temperature calculation module 302 that calculates and outputs a first clutch plate temperature 304, a second clutch plate temperature 306, and a clutch housing temperature 308 based on the clutch thermal model of the present disclosure, referred to collectively as clutch temperature signals 310. The temperature calculation module 302 may further output first and second clutch temperature rising signals 312 and 314. For example, the first and second clutch temperature rising signals 312 and 314 indicate whether respective temperatures of the first clutch plate 208 and the second clutch plate 210 are rising.

The temperature calculation module 302 receives first and second clutch slip power signals 324 and 326 from first and second clutch slip power modules 328 and 330, respectively. For example, the first clutch slip power module 328 may calculate the first clutch slip power signal 324 based on clutch torque 332 and clutch slip speed 334 associated with the first clutch plate 206. The second clutch slip power module 330 may calculate the second clutch slip power signal 326 based on clutch torque 336 and clutch slip speed 338 associated with the second clutch plate 208. The first and second clutch slip power signals 324 and 326 represent heat generated in the respective clutch plates 306, 308 as a result of clutch torque and clutch slip speed.

The temperature calculation module 302 further receives an ambient air temperature 340, a transmission oil temperature 342, and an engine coolant temperature 344. The temperature calculation module 302 calculates the clutch temperature signals 310 using the clutch thermal model based on the first and second clutch slip power signals 324 and 326, the ambient air temperature 340, the transmission oil temperature 342, and the engine coolant temperature 344.

For example, the clutch thermal model of the present disclosure is based on heat transfer between the first clutch plate 206, the second clutch plate 208, and air within the clutch housing 204. Further, clutch slip causes heat transfer to ambient air, engine coolant, and transmission oil. Accordingly, the clutch thermal model is based on the first and second clutch slip power signals 324 and 326, the ambient air temperature 340, the transmission oil temperature 342, and the engine coolant temperature 344.

The clutch thermal model includes a three state space linear time-invariant (LTI) model according to a first equation EQ1:

$$\begin{cases} \dfrac{dT}{dt} = A \cdot T + B \cdot u \\ y = C \cdot T \end{cases}$$

Where:
$T = [T_{clutch1}, T_{clutch2}, T_{clutch\_air}]^T$
$u = [P_{clutch1}, P_{clutch2}, T_{transoil}, T_{engcool}, T_{airamb}]^T$
$y = [T_{clutch1}, T_{clutch2}]^T$
$C = [1,1,1]^T \Rightarrow y = T$ In the first equation EQ1, internal states of the clutch thermal model include a first clutch plate temperature, a second clutch plate temperature, and a clutch housing temperature. The first and second clutch slip power signals 324 and 326 (i.e. $P_{clutch1}$ and $P_{clutch2}$), the ambient air temperature 340 (i.e. $T_{airamb}$), the transmission oil temperature 342 (i.e. $T_{transoil}$), and the engine coolant temperature 344 (i.e. $T_{engcool}$) are inputs to the first equation EQ1. Clutch temperatures (e.g. temperatures of the clutch plates 206, 208 and air within the clutch housing 204) are outputs of the first equation EQ1. Matrices A, B, and C have dimensions 3×3, 3×5, and 2×3, respectively.

Figure 4:
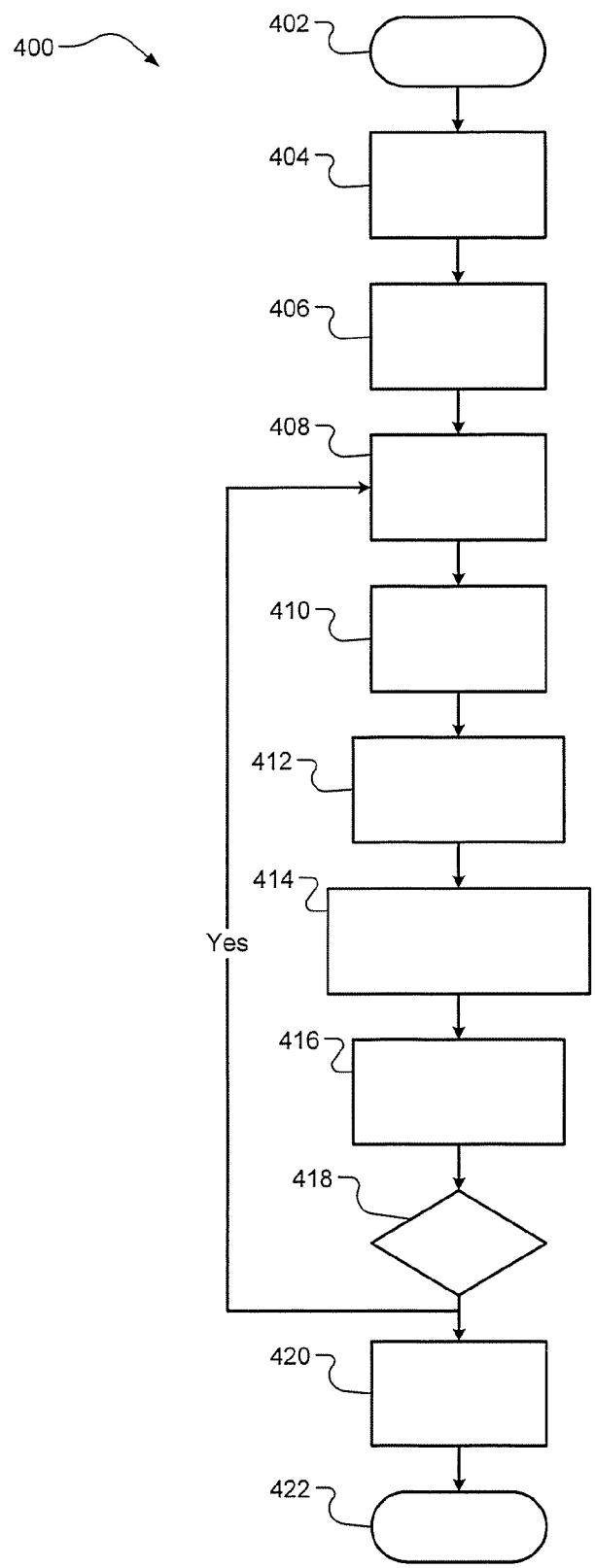
FIG. 4 is a flow diagram illustrating steps of a clutch temperature prediction method according to the principles of the present disclosure.

Referring now to FIG. 4, a clutch temperature prediction method 400 begins in step 402. In step 404, the clutch thermal model is calibrated. For example, the first equation EQ1 of the clutch thermal model is based on the following heat balance equations EQ2:

$$\begin{cases} M_{Pcl1} \dot{T}_{cl1} = k_{cl1\_cl2} \cdot (T_{cl2} - T_{cl1}) + k_{cl1\_cha} \cdot (T_{cha} - T_{cl1}) + k_{cl1\_troil} \cdot \\ \quad (T_{cl1} - T_{troil}) + k_{cl1\_engcool} \cdot (T_{cl1} - T_{engcool}) + k_{cl1\_airamb} \cdot (T_{cl1} - T_{airamb}) + \\ \quad u_1 \cdot P_{cl1} \\ M_{Pcl2} \dot{T}_{cl2} = k_{cl1\_cl2} \cdot (T_{cl1} - T_{cl2}) + k_{cl2\_cha} \cdot (T_{cha} - T_{cl2}) + k_{cl1\_troil} \cdot \\ \quad (T_{cl1} - T_{troil}) + k_{cl2\_engcool} \cdot (T_{cl1} - T_{engcool}) + k_{cl2\_airamb} \cdot (T_{cl1} - T_{airamb}) + \\ \quad u_2 \cdot P_{cl2} \\ M_{Pcha} \dot{T}_{cha} = k_{cl1\_cha} \cdot (T_{cl1} - T_{cha}) + k_{cl2\_cha} \cdot (T_{cl2} - T_{cha}) + k_{cha\_troil} \cdot \\ \quad (T_{cl1} - T_{troil}) + k_{cha\_engcool} \cdot (T_{cl1} - T_{engcool}) + k_{cha\_airamb} \cdot (T_{cl1} - T_{airamb}) + \\ \quad (1 - u_1) \cdot P_{cl1} + (1 - u_2) \cdot P_{cl2} \end{cases}$$

Where M is a coefficient corresponding to a component mass*component heat capacity and K is a coefficient corresponding to a component heat transfer coefficient*a component heat transfer area. The heat balance equations EQ2 include coefficients corresponding to heat balances between the following components: a first clutch plate (cl1), a second clutch plate (cl2), clutch housing (cha), transmission oil (troil), engine coolant (engcool), and ambient air temperature (airamb). Calibrating the clutch thermal model includes adjusting the coefficients of the model such that outputs of the model correspond to actual measured test data. The model uses the calibrated coefficients as well as the inputs of current mechanical and thermal conditions (i.e. the first and second clutch slip power signals 324 and 326, the ambient air temperature 340, the transmission oil temperature 342, and the engine coolant temperature 344) to accurately predict the temperatures of the clutch housing 204 and the clutch plates 206, 208.

In step 406, the vehicle is turned on. In step 408, the method 400 determines environmental conditions. For example, the clutch thermal model receives the ambient air temperature 340, the transmission oil temperature 342, and the engine coolant temperature 344. The clutch thermal model may receive the environmental conditions from one or more sensors associated with corresponding locations within the vehicle.

In step 410, method 400 determines temperatures of the clutch housing 204 and the clutch plates 206, 208. For example, if the vehicle has been off for a predetermined period, the temperatures of the clutch housing 204 and the clutch plates 206, 208 may be determined to be equivalent to the ambient air temperature 340. If the vehicle has not been off for the predetermined period, the temperatures of the clutch housing 204 and the clutch plates 206, 208 may be determined based on previously stored temperatures of the clutch housing 204 and the clutch plates 206, 208 and a difference between a last key-off time and a current time.

In step 412, the method 400 determines clutch slip speed and clutch torque. For example only, the method 400 may determine the clutch slip speed and the clutch torque from one or more sensors and/or estimates received from the ECM 116. If this is the first iteration of the method 400 upon start up of the vehicle, the clutch slip speed and clutch torque will be zero.

In step 414, the clutch thermal model calculates and outputs the first clutch plate temperature 304, the second clutch plate temperature 306, the clutch housing temperature 308, and the first and second clutch temperature rising signals 312 and 314. In step 416, the method 400 stores the outputs of the clutch thermal model. In step 418, the method 400 determines whether the vehicle is still on. If true, the method 400 continues to step 408 to repeat steps 408 through 418. If false, the method 400 continues to step 420. In step 420, the method 400 stores the key-off time for use in step 410 of subsequent iterations of the method 400. The method 400 terminates in step 422.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A clutch temperature prediction module for a dual clutch transmission (DCT), the clutch temperature prediction module comprising:
    at least one clutch slip power module that determines a first clutch slip power of a first clutch and a second clutch slip power of a second clutch; and
    a temperature calculation module that receives the first clutch slip power, the second clutch slip power, an ambient air temperature, an engine oil temperature, and a transmission oil temperature, and that calculates at least one clutch plate temperature and a clutch housing temperature based on the first clutch slip power, the second clutch slip power, the ambient air temperature, the engine oil temperature, and the transmission oil temperature using a linear time-invariant (LTI) model,
    wherein the LTI model is a three state model based on a first clutch plate, a second clutch plate, and a clutch housing, and
    wherein the LTI model is based on at least one heat balance equation associated with the DCT.

2. The clutch temperature prediction module of claim 1 wherein the temperature calculation module stores previously calculated clutch plate temperatures and clutch housing temperatures.

3. The clutch temperature prediction module of claim 2 wherein the temperature calculation module calculates the at least one clutch plate temperature and the clutch housing temperature further based on the previously calculated clutch plate temperatures and clutch housing temperatures.

4. The clutch temperature prediction module of claim 1 wherein the at least one clutch slip power module determines the first clutch slip power based on a first clutch torque and a first clutch slip speed and determines the second clutch slip power based on a second clutch torque and a second clutch slip speed.

5. The clutch temperature prediction module of claim 1 wherein the temperature calculation module outputs at least one signal that indicates whether the clutch plate temperature is increasing.

6. The clutch temperature prediction module of claim 1 wherein the temperature calculation module calculates the at least one clutch plate temperature and the clutch housing temperature further based on whether a vehicle including the DCT is turned off for at least a predetermined period.

7. The clutch temperature prediction module of claim 1 wherein the temperature calculation module calculates the at least one clutch plate temperature and the clutch housing temperature further based on a difference between a last key-off time and a current time.

8. A method for predicting temperature in a dual clutch transmission (DCT), the method comprising:
using a processor, performing each of:
determining a first clutch slip power of a first clutch and a second clutch slip power of a second clutch;
receiving the first clutch slip power, the second clutch slip power, an ambient air temperature, an engine oil temperature, and a transmission oil temperature; and
calculating at least one clutch plate temperature and a clutch housing temperature based on the first clutch slip power, the second clutch slip power, the ambient air temperature, the engine oil temperature, and the transmission oil temperature using a linear time-invariant (LTI) model,
wherein the LTI model is a three state model based on a first clutch plate, a second clutch plate, and a clutch housing, and
wherein the LTI model is based on at least one heat balance equation associated with the DCT.

9. The method of claim 8 further comprising storing previously calculated clutch plate temperatures and clutch housing temperatures.

10. The method of claim 9 further comprising calculating the at least one clutch plate temperature and the clutch housing temperature further based on the previously calculated clutch plate temperatures and clutch housing temperatures.

11. The method of claim 8 further comprising:
determining the first clutch slip power based on a first clutch torque and a first clutch slip speed; and
determining the second clutch slip power based on a second clutch torque and a second clutch slip speed.

12. The method of claim 8 further comprising outputting at least one signal that indicates whether the clutch plate temperature is increasing.

13. The method of claim 8 further comprising calculating the at least one clutch plate temperature and the clutch housing temperature further based on whether a vehicle including the DCT is turned off for at least a predetermined period.

14. The method of claim 8 further comprising calculating the at least one clutch plate temperature and the clutch housing temperature further based on a difference between a last key-off time and a current time.

* * * * *